(12) United States Patent
Ishiwata et al.

(10) Patent No.: US 9,104,727 B2
(45) Date of Patent: Aug. 11, 2015

(54) SEARCH APPARATUS AND METHOD FOR CONTROLLING SEARCH APPARATUS

(75) Inventors: Hidenori Ishiwata, Kawasaki (JP); Fumiaki Itoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 620 days.

(21) Appl. No.: 12/472,996

(22) Filed: May 27, 2009

(65) Prior Publication Data

US 2009/0300005 A1   Dec. 3, 2009

(30) Foreign Application Priority Data

May 29, 2008  (JP) ................................ 2008-141057

(51) Int. Cl.
*G06F 17/30* (2006.01)
(52) U.S. Cl.
CPC .............................. *G06F 17/30448* (2013.01)
(58) Field of Classification Search
USPC .......................... 707/754, 758, 759, 765, 728
See application file for complete search history.

(56) References Cited

U.S. PATENT DOCUMENTS

| | | | |
|---|---|---|---|
| 6,687,716 B1* | 2/2004 | Bradley | 707/822 |
| 6,694,331 B2* | 2/2004 | Lee | 707/706 |
| 7,493,613 B2* | 2/2009 | D'Souza et al. | 717/173 |
| 7,933,889 B2* | 4/2011 | Smetters et al. | 707/708 |
| 2003/0036927 A1* | 2/2003 | Bowen | 705/4 |
| 2006/0112081 A1* | 5/2006 | Qureshi | 707/3 |
| 2007/0237136 A1* | 10/2007 | Sako et al. | 370/368 |
| 2007/0266007 A1* | 11/2007 | Arrouye et al. | 707/3 |
| 2008/0071769 A1* | 3/2008 | Jagannathan | 707/5 |
| 2008/0077571 A1* | 3/2008 | Harris et al. | 707/5 |

FOREIGN PATENT DOCUMENTS

| | | |
|---|---|---|
| JP | 3255121 B2 | 2/2002 |
| JP | 2002-189746 A | 7/2002 |
| JP | 2007-027992 A | 2/2007 |

* cited by examiner

*Primary Examiner* — Alexey Shmatov
(74) *Attorney, Agent, or Firm* — Canon U.S.A., Inc. IP Division

(57) ABSTRACT

A method for controlling a search apparatus that searches a plurality of data each having an attribute value for each attribute item according to a search condition defined by the attribute value, the method includes detecting a change of the attribute value of one or more data of the plurality of data, changing the search condition including the changed attribute value according to the detected change of the attribute value, and performing a search according to the changed search condition.

10 Claims, 11 Drawing Sheets

300 SEARCH CONDITION TABLE

| | 301 | 302 | 303 | 304 |
|---|---|---|---|---|
| 1 | A'S WORK, | C:¥users | "DIVISION" = "AAA DEVELOPMENT SECTION" and "EDITOR" = "USER A" | |
| 2 | ACCMPLISHMENT IN 2007 | C:¥work¥year | JANUARY/1/2007 ≦ "DATE AND TIME" ≦ "DECEMBER/31/2007" | |

FIG. 3

300 SEARCH CONDITION TABLE

| 301 | 302 | 303 | 304 |
|---|---|---|---|
| 1 | A'S WORK, | C:¥users | "DIVISION" = "AAA DEVELOPMENT SECTION" and "EDITOR" = "USER A" |
| 2 | ACCOMPLISHMENT IN 2007 | C:¥work¥year | JANUARY/1/2007 ≦ "DATE AND TIME" ≦ "DECEMBER/31/2007" |

FIG. 4

400 DATA LIST TABLE

| 401 | 402 | 403 | 404 | 405 | 406 |
|---|---|---|---|---|---|
| 1 | SPECIFICATIONS | C:\work\projectX\doc | AAA DEVELOPMENT SECTION | USER A | MAY/15/2007 |
| 2 | PROJECTS | C:\work\projectX\doc | BBB DEVELOPMENT SECTION | USER B | JUNE/17/2007 |
| 3 | PLANS | C:\work\projectY\doc | CCC DEVELOPMENT SECTION | USER C | NOVEMBER/20/2006 |
| 4 | SCHEDULE | C:\work\2007 | AAA DEVELOPMENT SECTION | USER A | JANUARY/16/2007 |
| 5 | INVENTION DESCRIPTIONS 001 | C:\patent | AAA DEVELOPMENT SECTION | USER A | MARCH/9/2006 |

FIG. 5

SEARCH FOLDER "A'S WORK"

| 501 | 502 | 503 | 504 | 505 | 506 |
|---|---|---|---|---|---|
| 1 | SPECIFICATIONS | C:¥work¥projectX¥doc | AAA DEVELOPMENT SECTION | USER A | MAY/15/2007 |
| 4 | SCHEDULE | C:¥work¥2007 | AAA DEVELOPMENT SECTION | USER A | JANUARY/16/2007 |
| 5 | INVENTION DESCRIPTIONS 001 | C:¥patent | AAA DEVELOPMENT SECTION | USER A | MARCH/9/2006 |

FIG. 7

SEARCH FOLDER "A'S WORK"

| 701 | 702 | 703 | 704 | 705 | 706 |
|---|---|---|---|---|---|
| 1 | SPECIFICATIONS | C:¥work¥projectX¥doc | DDD DEVELOPMENT SECTION | USER A | MAY/15/2007 |
| 4 | SCHEDULE | C:¥work¥2007 | DDD DEVELOPMENT SECTION | USER A | JANUARY/16/2007 |
| 5 | INVENTION DESCRIPTIONS 001 | C:¥patent | DDD DEVELOPMENT SECTION | USER A | MARCH/9/2006 |

FIG. 8

800 INFORMATION CHANGE TABLE

| 801 | 802 | 803 | 804 |
|---|---|---|---|
| 1 | DIVISION | AAA DEVELOPMENT SECTION | DDD DEVELOPMENT SECTION |
| 4 | DIVISION | AAA DEVELOPMENT SECTION | DDD DEVELOPMENT SECTION |
| 5 | DIVISION | AAA DEVELOPMENT SECTION | DDD DEVELOPMENT SECTION |

SEARCH FOLDER "HAWAII TRIP"

| 901 | 902 | 903 | 904 | 905 |
|---|---|---|---|---|
| 1 | 001.jpg | MAUI ISLAND | MOM | SEPTEMER/15/2007 11:26 |
| 2 | 002.jpg | MAUI ISLAND | MARY | SEPTEMER/15/2007 11:28 |
| 4 | 003.jpg | MAUI ISLAND | MARY | SEPTEMER/15/2007 11:29 |
| 6 | 004.jpg | MAUI ISLAND | DAD | SEPTEMER/15/2007 11:36 |
| 18 | 005.jpg | OAHU ISLAND | MOM | SEPTEMER/16/2007 14:15 |
| 21 | 006.jpg | OAHU ISLAND | MARY | SEPTEMER/16/2007 14:22 |

FIG. 10

SEARCH FOLDER "HAWAII TRIP"

| | 1001 | 1002 | 1003 | 1004 | 1005 |
|---|---|---|---|---|---|
| | | | | | |
| 1 | 001.jpg | HAWAII | MOM | SEPTEMER/15/2007 11:26 |
| 2 | 002.jpg | HAWAII | MARY | SEPTEMER/15/2007 11:28 |
| 4 | 003.jpg | HAWAII | MARY | SEPTEMER/15/2007 11:29 |
| 6 | 004.jpg | HAWAII | DAD | SEPTEMER/15/2007 11:36 |
| 18 | 005.jpg | HAWAII | MOM | SEPTEMER/16/2007 14:15 |
| 21 | 006.jpg | HAWAII | MARY | SEPTEMER/16/2007 14:22 |

FIG. 11

```
SEARCH CONDITION OF SEARCH FOLDER WILL BE CHANGED AS FOLLOWS.
OK?
  SEARCH FOLDER NAME: "A'S WORK"

(CURRENT) SEARCH CONDITION : "DIVISION" = "AAA DEVELOPMENT
  SECTION" and "EDITOR" = "USER A"
                    ⇩
  (CHANGED) SEARCH CONDITION : "DIVISION" = "DDD DEVELOPMENT
  SECTION" and "EDITOR" = "USER A"

[ OK ]        [ CANCEL ]
```
1101

SEARCH APPARATUS AND METHOD FOR CONTROLLING SEARCH APPARATUS

BACKGROUND OF THE INVENTION

1. Field of the Invention

The present invention relates to a search apparatus that searches data according to a search condition and a method for controlling the search apparatus.

2. Description of the Related Art

A conventional method for searching data having attribute information includes a search folder function for collecting data by using a key word or an attribute value as a key specified by a user. For example, the search folder function includes a smart folder for Mac OS X (registered trade mark) and a search folder for Windows (registered trade mark) Vista (refer to Microsoft, "Search Folder". Upon setting a key word and attribute information such as date, by using the search folder function, the user can find out the target data without being aware of a physical location on a personal computer (PC) where the data is stored.

However, conventional methods have a problem in which data having a changed attribute value of the attribute item set as a search condition of a search folder may be unintentionally omitted from the search folder. A further problem is that, when the attribute value of the attribute item of the data is changed to prevent the data from being omitted from the search folder, a relevant part of the search condition for the search folder must be manually set once again.

SUMMARY OF THE INVENTION

The present invention is directed to a method, when an attribute value of target data is changed, for automatically changing a relevant part of a search condition to prevent the data from being omitted from a search folder and to decrease troublesome works caused by a change of the search condition.

According to an aspect of the present invention, a method for controlling a search apparatus that searches a plurality of data each having an attribute value for each attribute item according to a search condition defined by the attribute value is provided. The method includes detecting a change of the attribute value of one or more data of the plurality of data, changing the search condition including the changed attribute value according to the detected change of the attribute value, and performing a search according to the changed search condition.

According to another aspect of the present invention, a search apparatus that searches a plurality of data each having an attribute value for each attribute item according to a search condition defined by the attribute value is provided. The search apparatus includes an attribute value change detection unit configured to detect a change of the attribute value of one or more data of the plurality of data, a search condition change unit configured to change the search condition according to the change detected by the attribute value change detection unit, and a search unit configured to search according to the search condition changed by the search condition change unit.

According to an exemplary embodiment of the present invention, the relevant part of the search condition is automatically changed when the attribute value of the target data is changed to prevent the data from being omitted from the search folder and to decrease the troublesome work caused by the change of the search condition.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example search condition table according to an exemplary embodiment of the present invention.

FIG. 4 illustrates an example data list table according to an exemplary embodiment of the present invention.

FIG. 5 illustrates an example data included in a search folder according to an exemplary embodiment of the present invention.

FIG. 7 illustrates an example of the search folder after an attribute value is changed according to an exemplary embodiment of the present invention.

FIG. 8 illustrates an example of an information change table according to an exemplary embodiment of the present invention.

FIG. 10 illustrates an example of data included in the search folder according to an exemplary embodiment of the present invention.

FIG. 11 illustrates an example of a screen displayed for a user according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
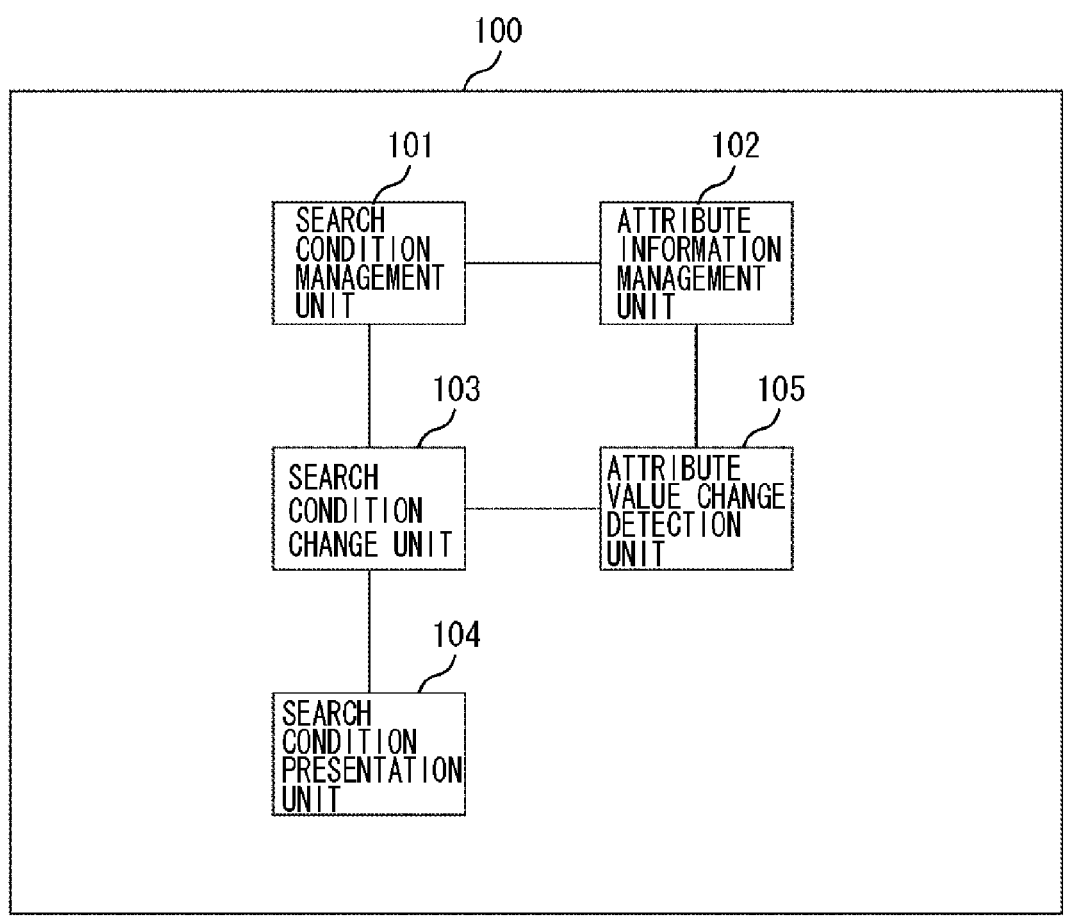
FIG. 1 is a block diagram illustrating a configuration of a search apparatus according to an exemplary embodiment of the present invention.

FIG. 1 is a block diagram illustrating a configuration example of a search apparatus 100 according to a first exemplary embodiment of the present invention. A search condition management unit 101 manages a search condition of a search folder.

Here, the search folder includes data that corresponds to the search condition of the search folder from among a plurality of data (i.e., search targets).

Further, each of the plurality of data that are the search targets has an attribute value corresponding to an attribute item. Further, the search condition is used to search data that is defined by a conditional expression of the attribute value or individually defined for an attribute value of each attribute item. An attribute information management unit 102 manages the attribute item and the attribute value of the data.

An attribute value change detection unit 105 detects a change of the attribute value. A search condition change unit 103 changes the search condition of the search folder according to the change detected by the attribute value change detection unit 105. The search condition change unit 103 holds a rule for changing the search condition and refers to the rule when necessary to change the search condition.

Details of processing for changing the search condition will be described below. A search condition presentation unit 104 presents to the user a target search folder or the search condition of the search folder changed by the search condition change unit 103.

Figure 2:
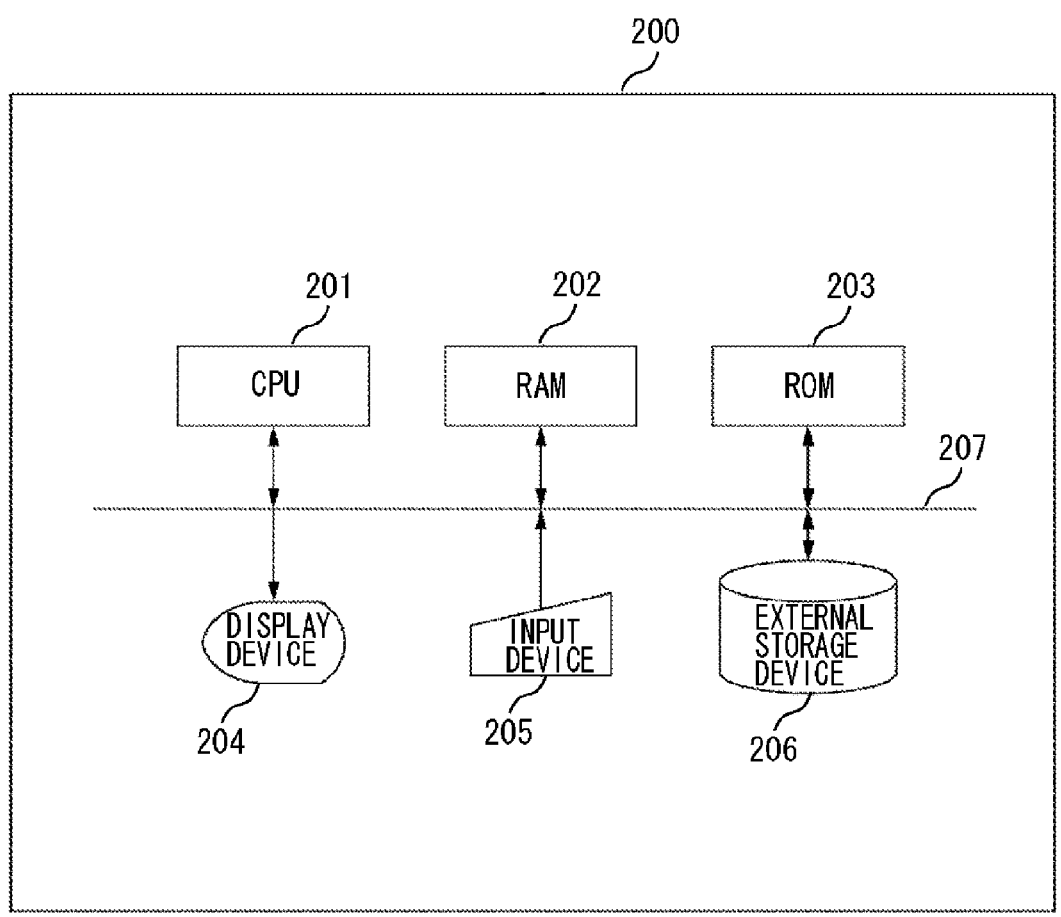
FIG. 2 illustrates an example hardware configuration of the search apparatus according to an exemplary embodiment of the present invention.

FIG. 2 is a block diagram illustrating a hardware configuration of the search apparatus 100 according to the first exemplary embodiment of the present invention. In FIG. 2, a central processing unit (CPU) 201 controls a whole computer apparatus 200. A random access memory (RAM) 202 temporarily stores a program and data supplied from an external apparatus.

A read only memory (ROM) 203 stores a control program or parameters needless to be changed. A display device 204 presents to the user the target search folder or the search condition presented in the search condition presentation unit 104. The user inputs the change of the attribute value of the data from an input device 205.

An external storage device 206 stores the attribute item and the attribute value of the data. A system bus 207 communicably connects units 201, 202, 203, 204, 205, and 206 with each other. The plurality of data (i.e., search targets) may be stored in a computer apparatus 200 or an external apparatus through the Internet, or in both of the apparatuses described above.

A program for realizing the search apparatus 100 of the present exemplary embodiment will be described below. Not otherwise described, the present program executes processing of each step under control of the CPU 201 described below.

FIG. 3 illustrates an example of a search condition table 300 managed by the search condition management unit 101. Four types of items are managed as follows.
Search folder ID 301: An ID uniquely specifying a search folder
Search folder Name 302: A name of a search folder
Search folder Pass 303: A location where a search folder is generated
Search condition 304: A search condition of a search folder According to the present exemplary embodiment, a search condition 304 is held in a form of a conditional expression of the attribute value, however, can also be managed in other forms. For example, the search condition 304 can be managed by being individually defined for each attribute value of each attribute item, which may be a condition. Further, the search condition 304 may not include the search folder name but display the search condition as the search folder name.

FIG. 4 illustrates an example of a data list table 400 controlled by the attribute information management unit 102. Six types of items are managed as follows.
Data ID 401: An ID uniquely specifying data
Data name 402: A name of data
Data pass 403: A place where data is stored
Division 404: A division name to which a data editor belongs
Editor 405: A name of a data editor
Date and time 406: Date and time when data is generated According to the present exemplary embodiment, the above-described six types of information are held. However, in addition to the information, various types of attribution information can be managed by providing it to the data.

FIG. 5 illustrates data included in a search folder "Search Folder ID 301=1" in a state where the search condition management unit 101 and the attribute information management unit 102 manage tables respectively illustrated in FIGS. 3 and 4. The items 501 through 506 correspond to items 401 through 406 of FIG. 4.

In the data managed by a data list table 400, the data corresponding to the condition "Search Folder ID=1" in the search condition table 300, that is, the data of "DIVISION=AAA DEVELOPMENT SECTION" and "EDITOR=USER A" is displayed in the search folder.

Figure 6:
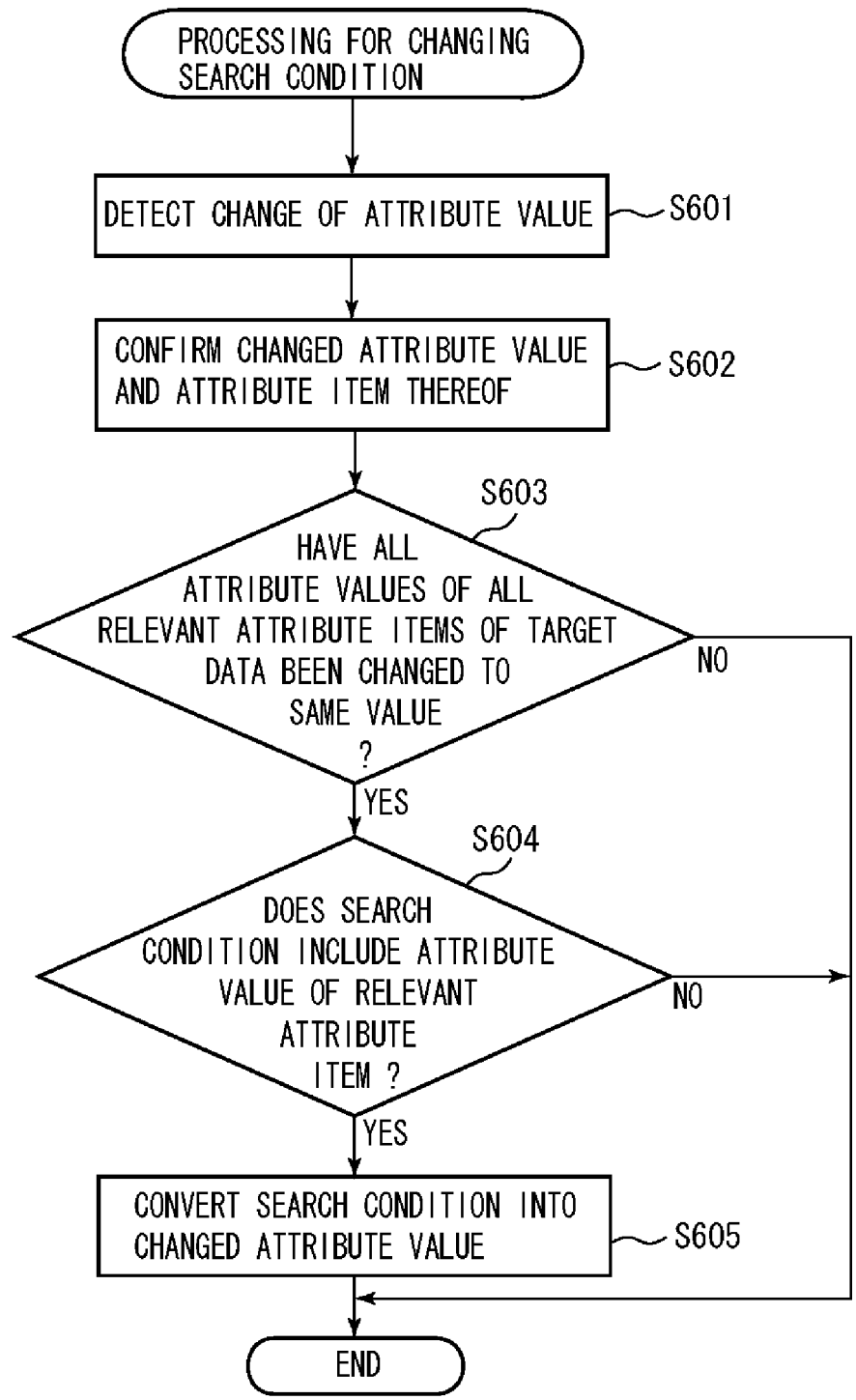
FIG. 6 is a flowchart illustrating processing for changing a search condition according to an exemplary embodiment of the present invention.

FIG. 6 is a flowchart illustrating processing for changing the search condition. The processing for changing the search condition will be described according to the flowchart illustrated in FIG. 6, by using an example in which the attribute value of the data in the search folder illustrated in FIG. 5 is changed.

It is supposed that the user executes an operation for changing an attribute value 504 "AAA DEVELOPMENT SECTION" that indicates a "DIVISION" for all the data in the search folder illustrated in FIG. 5 to a "DDD DEVELOPMENT SECTION" as illustrated in FIG. 7. A conversion may be executed collectively (batch-conversion) on the whole data in the search folder, or a conversion may be individually executed on each data. The items 701 through 706 correspond to items 401 through 406 of FIG. 4.

When the data is displayed in a list form in the search folder as illustrated in FIG. 5, a method for executing the batch conversion may be adopted as follows. First, the user selects a column of the attribute item that is to be changed and presses a displayed batch-conversion button. Then, a dialog for inputting the attribute value to be changed is displayed. The user inputs the attribute value to be changed in the dialog box and presses an OK button.

When the user executes the conversion processing, in step S601, the attribute value change detection unit 105 detects that the attribute value is changed. When the attribute value change detection unit 105 detects the change, in step S602, the attribute value to be changed and the attribute item thereof are confirmed.

The confirmed information is managed by, for example, an information change table 800 illustrated in FIG. 8. Four types of items are managed as follows.
Data ID 801: An ID uniquely specifying data
Changed attribute Item 802: An attribute item of a changed attribute value
Attribute value 803 before being changed: An attribute value before being changed
Attribute value 804 after being changed: A changed attribute value (attribute value after being changed)

Next, in step S603, it is confirmed whether all of the attribute values of the relevant attribute item for all target data are changed to a same value. According to the present exemplary embodiment, it is confirmed that all attribute values or the "DIVISION" of the data stored in the search folder are changed to the "DDD DEVELOPMENT SECTION".

Whether all the attribute values of the data are changed is determined by whether the data ID of the data stored in the search folder corresponds to the data ID of the relevant data managed by the information change table 800. As a result, when it is determined that all attribute values of the relevant attribute item are changed to the same value (YES in step S603), in step S604, it is confirmed whether the search condition includes the attribute value of the attribute item.

According to the present exemplary embodiment, it is confirmed that the search condition includes the "AAA DEVELOPMENT SECTION" that is an attribute value 803 before being changed (YES in step S604). Lastly, in step S605, the "AAA DEVELOPMENT SECTION" that is included in the search condition and is the attribute value 803 before being changed is changed to the "DDD DEVELOPMENT SECTION" that is the attribute value 804 after being changed, and the processing for changing ends.

Conventionally, although the processing for changing the attribute value of the data is executed, the search condition for the search folder is not automatically changed. Therefore, at this point, no data exists that corresponds to the search condition "DIVISION"="AAA DEVELOPMENT SECTION" and "EDITOR"="USER A". Accordingly, the search folder becomes empty.

In order to avoid the empty state, it is necessary for the user to manually change the search condition. However, according to the present exemplary embodiment, the search condition after the attribute value is changed is automatically changed to "DIVISION"="DDD DEVELOPMENT SECTION" and "EDITOR"="USER A". Therefore, even after the processing for changing the attribute value, it is not necessary for the user to manually change the search condition. Accordingly, the state in which the data including the attribute value before being changed corresponds to the search condition for the search folder can be maintained.

When the attribute value does not correspond to the search condition in step S603 or step S604, the processing for changing the search condition ends without being executed.

The first exemplary embodiment describes the processing for changing one attribute value. A second exemplary embodiment will describe processing for setting one search condition when a plurality of attribute values for the same attribute item are set as the search condition and when the plurality of attribute values are changed to one attribute value. A basic configuration of the second exemplary embodiment is similar to the first exemplary embodiment, and thus the descriptions of the second exemplary embodiment will be omitted.

Figure 9:
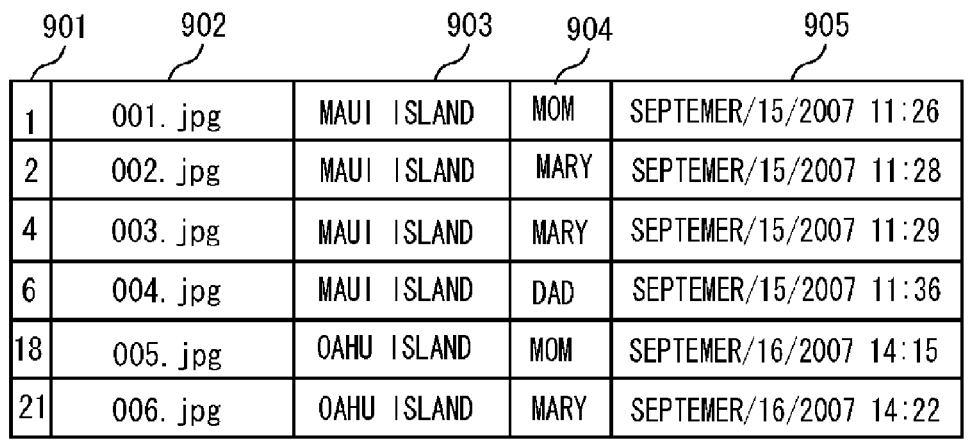
FIG. 9 illustrates an example at a included in the search folder according to an exemplary embodiment of the present invention.

FIG. 9 illustrates an example of data included in the search folder according to the second exemplary embodiment of the present invention.

For example, it is supposed that, when there is a search folder "HAWAII TRIP" having a search condition "PHOTOGRAPHING LOCATION"="OAHU ISLAND" or "MAUI ISLAND", the search folder stores data as illustrated in FIG. 9 including a data ID 901, a data name 902, a photographing location 903, an object 904, and a photographing date and time 905. Here, when all photographing locations are changed to "HAWAII", the search condition is changed to "PHOTOGRAPHING LOCATION"="HAWAII".

More specifically, similarly to the first exemplary embodiment, after it is confirmed whether all attribute values for the relevant attribute item are changed to the same value, the attribute value before being changed included in the search condition is changed to the attribute value after being changed.

According to the present exemplarily embodiment, two attribute values before being changed are changed to the values different therefrom, however, one of the two attribute values before being changed may be used as the attribute value after being changed. For example, in a case where there is a search folder having a search condition "OBJECT"="WIFE" or "MARY" (MARY is a wife's name), when all attribute values of the object is changed to a "WIFE", the search condition may be changed to "OBJECT"="WIFE".

This example is also different from the first exemplary embodiment in that the attribute values of all data in the search folder do not need to be changed but only the attribute values of a part of data may be changed.

According to the example as described above, one of the two types of attribute values before being changed is used as the attribute value after being changed, however, one of three or more types of attribute values before being changed may be used as the attribute value after being changed.

The first and second exemplary embodiments describe the processing for using one attribute value after being changed. A third exemplary embodiment of the present invention describes, when the attribute values set as the search condition are changed to a plurality of values, processing for setting a logical OR of the plurality of attribute values as the search condition.

A basic configuration of the third exemplary embodiment is also similar to that of the first exemplary embodiment, and thus the descriptions of the third exemplary embodiment will be omitted.

FIG. 10 is illustrates an example of data included in the search folder according to the third exemplary embodiment of the present invention. The third exemplary embodiment has the processing opposite to the second exemplary embodiment.

For example, there is a search folder "Hawaii Trip" having a search condition "PHOTOGRAPHING LOCATION"="Hawaii" and stores data as illustrated in FIG. 10 including a data ID 1001, a data name 1002, a photographing location 1003, an object 1004, and a photographing date and time 1005.

Here, when the photographing location is changed to "Oahu Island" and "Maui Island", the search condition is changed to "PHOTOGRAPHING LOCATION"="Oahu Island" or "Maui Island".

More specifically, all attribute values after being changed included in the search condition are combined by using a logical OR to set the search condition. According to the exemplary embodiment of the present invention, the attribute value before being changed is changed to two different values, however, a part of attribute values before being changed may be used as it is. In this case, the third exemplary embodiment is different from the first exemplary embodiment in that only the attribute values included in the data in the search folder may be changed.

According to the above-described example, one type of attribute value is changed to two types of attribute values, however, one type of attribute value may be changed to three or more types of attribute values.

According to the first to the third exemplary embodiments, the examples targeting only the specified search folders are described. However, when the attribute value of the data included in the specified search folder is changed, in addition to the search condition for the specified search folder, a search condition for other search folder can be also changed.

A method for changing the search condition for the other search folder may be similar to the method for changing the search condition for the specific search folder. Further, the search condition only for the other search folders can be changed by a different method. For example, the attribute value included in the search condition is not changed from the value before being changed to the value after being changed, but the logical OR of the attribute values before being changed and after being changed can be used.

When the attribute value in the other search folder is changed by a different method, the search condition change unit 103 holds the rule as described above so that the third embodiment can be realized by referring the rule.

In any case as described above, when there are a plurality of target search folders, the search conditions for all of the target search folders may be changed. Or, the search conditions of only a part of search folders may be also changed.

A basic configuration of a fourth exemplary embodiment of the present invention is similar to that of the first exemplary embodiment, and thus the descriptions will be omitted. However, the fourth exemplary embodiment is different from the first exemplary embodiment in that the target attribute value to be changed is a whole data management system.

For example, the whole data management system is searched for "DIVISION"="AAA DEVELOPMENT SECTION", and the "DIVISION" is converted collectively into the "DDD DEVELOPMENT SECTION" for all of the hit data. Here, a button for converting the attributes values collectively is displayed. When the button is pressed, "DIVISION"="AAA DEVELOPMENT SECTION" in each of the data is converted into "DIVISION"="DDD DEVELOPMENT SECTION".

In this case, it is confirmed whether the search condition table 300 illustrated in FIG. 3 includes the search folder including "DIVISION"="AAA DEVELOPMENT SECTION". When the search condition table 300 includes the search folder including the condition as described above, the condition about the "DIVISION" included in the search condition for the relevant search folder is converted from the attribute value "AAA DEVELOPMENT SECTION" before being changed into the "DDD DEVELOPMENT SECTION" after being changed. A method for a batch-conversion is not limited to the method described above.

A basic configuration of a fifth exemplary embodiment of the present invention is similar to that of the first exemplary embodiment, and thus the descriptions will be omitted here. According to the fourth exemplary embodiment, the attribute values of the whole system are changed. On the other hand, according to the fifth exemplary embodiment, the attribute values of a specified folder and subordinate folders thereof in a tree structure are changed. In the fifth exemplary embodiment, it is necessary to deal with the data that is not included in the specified folder and the subordinate folder thereof that are to be searched and yet has the attribute value.

For example, a specified folder and the subordinate folders thereof are searched with "DIVISION"="AAA DEVELOPMENT SECTION", and the batch-conversion for converting the data in "DIVISION" into the "DDD DEVELOPMENT SECTION" is performed on all of the hit data. In this case, when the search folder includes the specified folder and the subordinate folders thereof to be searched, no problems will arise by converting the condition for the "DIVISION" included in the search condition from the attribution value "AAA DEVELOPMENT SECTION" before being changed into the attribution value "DDD DEVELOPMENT SECTION" after being changed.

However, the problem arises when the search folder is not limited to the specified folder and the subordinate folders thereof to be searched, more specifically, when the search folder has a larger range to be searched than a range where the attribute values are converted.

If the attribute value of "DIVISION" included in the search condition is converted into the "DDD DEVELOPMENT SECTION", the data still having the "AAA DEVELOPMENT SECTION" as the "DIVISION" may be omitted from the search folder.

Thus, it is necessary to obtain the logical OR of the attribute values before and after being changed such as "DIVISION"="AAA DEVELOPMENT SECTION" or "DDD DEVELOPMENT SECTION" as the search condition for the search folder that is not limited to the specified folder and the subordinate folder thereof. The search condition change unit 103 holds a conversion rule so that the above-described processing can be realized by referring the rule.

A basic configuration in a sixth exemplary embodiment of the present invention is similar to the first exemplary embodiment, and thus the description will be omitted here. Basically, a combination of the second and third exemplary embodiments can realize the sixth embodiment, which changes a plurality of attribute values before being changed set as the search condition to a plurality of different attribute values.

The attribute value change detection unit 105 manages correspondence relation between the attribute values before being changed and the attribute values after being changed respectively, and reflects the correspondence relation to the search condition of the relevant search folders. For example, there is a search folder in which a condition of "PHOTOGRAPHING LOCATION"="OAHU ISLAND" or "MAUI ISLAND" or "KAUAI ISLAND" is set, and the data corresponding to the condition is stored.

At this time, since there is a plenty of data amount having the search condition of "PHOTOGRAPHING LOCATION"="OAHU ISLAND", the condition is divided into two conditions as follows.
"PHOTOGRAPHING LOCATION"="OAHU ISLAND (NORTH)"
"PHOTOGRAPHING LOCATION"="OAHU ISLAND (SOUTH)"
Further, since there is a small data amount of "PHOTOGRAPHING LOCATION"="MAUI ISLAND" and "PHOTOGRAPHING LOCATION"="KAUAI ISLAND", the data is combined to one as follows.
"PHOTOGRAPHING LOCATION"="HAWAII (OTHERS)"

In this case, the search condition is changed to the search condition acquired by merging the above two changes as follows. "PHOTOGRAPHING LOCATION"="OAHU ISLAND (NORTH)" or "OAHU ISLAND (SOUTH)" or "HAWAII ISLAND (OTHERS)"

In the first to sixth exemplary embodiments described above, the relevant part of the search condition of the search folder is automatically changed to prevent the data having the changed attribute value from being omitted from the search folder. Further, the troublesome work by the user when changing the search condition can be decreased.

A basic configuration of a seventh exemplary embodiment is similar to that of the first exemplary embodiment, and thus the descriptions will be omitted here. According to the first to sixth exemplary embodiments, the search condition of the search folder is automatically changed. On the other hand, according to the seventh exemplary embodiment, the target search folder or the search condition thereof is displayed for the user. FIG. 11 illustrates an example of a user display screen.

The user display screen 1101 according to the present exemplary embodiment displays a name of the target search folder and the search conditions before and after being changed of the search folder. The user determines whether to perform the change according to the displayed information and presses an OK button or a cancel button.

As described above, the target search folder or the search condition thereof can be displayed to the user.

A basic configuration of an eighth exemplary embodiment of the present invention is similar to that of the first exemplary embodiment, and thus the description will be omitted here. According to the eighth exemplary embodiment, a change history of the attribute value is managed. The attribute information management unit 102 manages the history of the changed attribute value so that the search condition of the search folder is internally changed according to the history and the relevant data is displayed.

More specifically, when the user instructs to develop the search folder, the change history of the attribute value included in the search condition is referred. When there is the change history of the attribute value, the attribute value stored as the history may be added to the set search condition as the logical OR to perform the search. The changing method is realized according to the algorism described in the first to seventh exemplary embodiments.

As described above, the change history of the attribute value included in the search condition is referred to and the relevant part of the search condition of the search folder is automatically changed so that the data including the changed attribute value is prevented from being omitted from the search folder. Further, the troublesome work by the user caused by the change of the search condition can be decreased.

Further, the attribute of which search condition can be automatically changed may be specified. For example, the search condition for the attribute of the photographing location may be automatically changed, and the search condition for the attribute of the final update may be set not to be automatically changed.

With this setting, only the attribute of the search condition that the user desires to change can be specified so that the troublesome work by the user caused by the change of the search condition can be decreased.

The exemplary embodiments are described in detail above, however, the present invention can be realized in any form such as a system, a device, a method, a program, and a storage medium. More specifically, the present invention may be applied to a system including a plurality of devices, and further to an apparatus including one device.

The present invention includes a case in which a program of software is directly or remotely supplied to a system or an apparatus and read by a computer in the system or the apparatus to be executed so that the functions of the above-described exemplary embodiments can be realized. In this case, the program to be supplied is a computer program corresponding to the flowchart illustrated in the figure of the exemplary embodiments.

Accordingly, the program code itself, which is installed in the computer to realize the functional processing of the present invention, realizes the present invention. More specifically, the present invention includes the computer program itself for realizing the functional processing of the present invention.

In this case, only if the program function is included, any embodiment such as an object code, a program executed by an interpreter, and script data to be supplied to an operation system (OS).

A computer-readable storage medium for supplying the computer program includes, for example, a floppy disk, a hard disk, an optical disk, a magnet optical disk (MO), a compact disk read only memory (CD-ROM), a CD-recordable (CD-R), a CD-rewritable (CD-RW), a magnetic tape, a non-volatile memory card, a ROM, and a digital versatile disk (DVD (DVD-ROM, DVD-R).

In addition, the method for supplying the program includes accessing a website of the Internet using a browser of a client computer and downloading the computer program of the present invention from the website to the storage media such as the hard disk. In this case, the program to be downloaded may be a file that is compressed and includes an automatic installation function.

Further, the program of the present invention is divided into a plurality of files and each of the files may be downloaded from the different websites to realize the present invention. Furthermore, the present invention includes a World Wide Web server that allows a plurality of users to download the program file for realizing the functional processing of the present invention by using the computer.

Moreover, the program of the present invention is enciphered and stored in the storage medium such as a CD-ROM, and delivered to the user. In this case, the authorized user may be allowed to download key information for deciphering from the website via the Internet and execute the program that is deciphered by using the key information so that the program can be installed in the computer.

Further, the computer executes the read out program to realize the functions of the above-described exemplary embodiments. According to an instruction of the program, the function of the exemplary embodiment may be realized in cooperation with the OS running on the computer. In this case, the OS executes a part of or all the actual processing, which can realize the functions of the above-described exemplary embodiment.

Furthermore, the program read out from the storage medium may be written into a memory provided in a function extension board inserted into the computer or a function extension unit connected to the computer so that a part of or all the functions of the above-described exemplary embodiments are realized.

In this case, after the program is written into the function extension board or the function extension unit, according to the instruction of the program, the CPU provided in the function extension board or the function extension unit executes a part of or all the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-141057 filed May 29, 2008, which is hereby incorporated by reference herein in its entirety.

What is claimed is:

1. A method for controlling a search apparatus using search folders that searches a plurality of data each having an attribute value for each attribute item according to a search condition defined by the attribute value, the method comprising:

detecting a change of at least one letter of the attribute value of one or more data in at least one search folder which has a search condition, wherein the attribute value specifies contents of data;

searching for a search folder including an attribute value before the change of at least one letter of the attribute value in a search condition;

changing the search condition of the searched search folder to a new search condition including the changed letter of attribute value according to the detected change of the attribute value, wherein said one or more data do not match the search condition but match the new search condition of the searched search folders, wherein the changed letter of attribute value specifies the identical contents of data in a different letter expression; and performing a search according to the new search condition, wherein the search condition is a form of the attribute value and is automatically changed to the new search condition based on the detected change of the attribute value.

2. The method according to claim 1, wherein the search condition is a condition of a search folder indicating data that meets the search condition from among the plurality of data.

3. The method according to claim 2, further comprising changing the data indicated by the search folder based on the change of the search condition.

4. The method according to claim 2, further comprising, when detecting the change of the attribute value, changing the search condition according to the attribute value before being changed and the attribute value after being changed.

5. The method according to claim 2, further comprising, when detecting the change of the attribute value of the data indicated by the search folder, confirming whether the search condition of the search folder includes the attribute value and, if the search condition includes the attribute value, changing the search condition.

6. The method according to claim 2, further comprising, when detecting a change of an attribute value of data included in a specified folder and subordinate folders of the specified folder in a tree structure, changing the search condition according to the attribute value before being changed and the attribute value after being changed.

7. The method according to claim 1, further comprising, when detecting a change of all data to a same attribute value, confirming whether the search condition includes the attribute value and, if the search condition includes the attribute value, changing the search condition.

8. The method according to claim 1, further comprising:
presenting a search condition; and
presenting to a user a target search folder or the changed search condition for the search folder.

9. A search apparatus using search folders that searches a plurality of data each having an attribute value for each attribute item according to a search condition defined by the attribute value, the search apparatus comprising:
a memory;
a processor coupled to the memory which executes the following:
detecting a change of at least one letter of the attribute value of one or more data in at least one search folder which has a search condition, wherein the attribute value specifies contents of data;
searching for a search folder including an attribute value before the change of at least one letter of the attribute value in a search condition;
changing the search condition of the searched search folders to a new search condition including the changed letter of attribute value according to the change detected, wherein said one or more data do not match the search condition but match the new search condition of the searched search folders, wherein the changed letter of attribute value specifies the identical contents of data in a different letter expression; and
searching according to the new search condition,
wherein the search condition is a form of the attribute value and is automatically changed to the new search condition based on the detected change of the attribute value.

10. A non-transitory computer-readable storage medium that stores a program for causing a computer to execute a method for controlling a search apparatus using search folders that searches a plurality of data each having an attribute value for each attribute item according to the search condition defined by the attribute value, the method comprising:
detecting a change of at least one letter of the attribute value of one or more data in at least one search folder which has a search condition, wherein the attribute value specifies contents of data;
searching for a search folder including an attribute value before the change of at least one letter of the attribute value in a search condition;
changing the search condition of the searched search folders to a new search condition including the changed letter of attribute value based on the detected change of the attribute value, wherein said one or more data do not match the search condition but match the new search condition of the searched search folders, wherein the changed letter of attribute value specifies the identical contents of data in a different letter expression; and
performing a search according to the new search condition,
wherein the search condition is a form of the attribute value and is automatically changed to the new search condition based on the detected change of the attribute value.

* * * * *